(12) United States Patent
Bozza et al.

(10) Patent No.: US 7,992,130 B2
(45) Date of Patent: Aug. 2, 2011

(54) CLASS-BASED OBJECT-ORIENTED FEATURES IN CLASS-LESS SCRIPT LANGUAGE

(75) Inventors: Bruno S. Bozza, Redmond, WA (US); Henricus Johannes Maria Meijer, Mercer Island, WA (US); Steven Thomas Beck, Bothell, WA (US); Jeffrey Van Gogh, Redmond, WA (US); Wei Zhu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 11/745,125

(22) Filed: May 7, 2007

(65) Prior Publication Data

US 2008/0282260 A1 Nov. 13, 2008

(51) Int. Cl.
*G06F 9/44* (2006.01)
*G06F 9/45* (2006.01)

(52) U.S. Cl. .................... 717/116; 717/108; 717/115

(58) Field of Classification Search .......... 717/105–110, 717/114–117, 120–121; 709/203–204
See application file for complete search history.

(56) References Cited

U.S. PATENT DOCUMENTS

| 5,297,284 | A | 3/1994 | Jones et al. | |
|---|---|---|---|---|
| 5,327,562 | A | 7/1994 | Adcock | |
| 5,442,793 | A | 8/1995 | Christian et al. | |
| 5,764,991 | A | 6/1998 | Carcerano | |
| 5,794,041 | A | 8/1998 | Law et al. | |
| 5,995,753 | A * | 11/1999 | Walker | 717/108 |
| 6,078,743 | A * | 6/2000 | Apte et al. | 717/100 |
| 6,182,283 | B1 | 1/2001 | Thompson | |
| 6,473,893 | B1 * | 10/2002 | Kay et al. | 717/116 |
| 6,578,192 | B1 * | 6/2003 | Boehme et al. | 717/115 |
| 6,675,377 | B1 | 1/2004 | Tanaka | |
| 6,704,924 | B1 | 3/2004 | Hasha | |
| 6,779,172 | B1 * | 8/2004 | Weerawarana et al. | 717/115 |
| 6,880,129 | B1 * | 4/2005 | Lee et al. | 715/763 |
| 6,918,084 | B1 * | 7/2005 | Slaughter et al. | 715/205 |
| 7,000,221 | B2 * | 2/2006 | Bhogal et al. | 717/115 |
| 7,017,146 | B2 * | 3/2006 | Dellarocas et al. | 717/106 |
| 7,032,211 | B1 * | 4/2006 | Janzig et al. | 717/120 |
| 7,039,900 | B2 * | 5/2006 | Lecerf | 717/116 |
| 7,103,873 | B2 * | 9/2006 | Tanner et al. | 717/109 |
| 7,103,878 | B2 | 9/2006 | Fahs et al. | |
| 7,178,129 | B2 * | 2/2007 | Katz | 717/108 |
| 7,426,721 | B1 * | 9/2008 | Saulpaugh et al. | 717/144 |
| 7,493,594 | B2 * | 2/2009 | Shenfield et al. | 717/107 |

(Continued)

FOREIGN PATENT DOCUMENTS

EP 0811192 B1 9/1995

OTHER PUBLICATIONS

Chen et al, "TACCLE: A methodology for object oriented software testing at the class and cluster levels", ACM Trans. of Software engineering and methodology, vol. 10,, No. 4, pp. 56-109, 2001.*

(Continued)

*Primary Examiner* — Anil Khatri

(57) ABSTRACT

Dynamic dispatch for classes and interfaces is encapsulated in a class-less scripting language. A plurality of mechanisms is employed to facilitate dynamic polymorphism. One or more target-language constructs, such as dictionary objects, prototype objects and/or derived types, are utilized to capture class and interface-method implementations. These constructs are subsequently referenced at runtime to invoke appropriate code.

14 Claims, 12 Drawing Sheets

U.S. PATENT DOCUMENTS

| | | | | |
|---|---|---|---|---|
| 7,574,692 B2 * | 8/2009 | Herscu | | 717/116 |
| 7,580,871 B2 * | 8/2009 | Brunner et al. | | 705/27 |
| 7,610,575 B2 * | 10/2009 | Sproule | | 717/103 |
| 7,647,370 B1 * | 1/2010 | Liu et al. | | 709/203 |
| 7,650,296 B1 * | 1/2010 | Brunner et al. | | 705/27 |
| 7,707,550 B2 * | 4/2010 | Resnick et al. | | 717/121 |
| 7,840,937 B1 * | 11/2010 | Chiluvuri | | 717/106 |
| 7,861,219 B2 * | 12/2010 | Kothari et al. | | 717/108 |
| 2002/0016864 A1 | 2/2002 | Brett | | |
| 2003/0131347 A1 | 7/2003 | Allison | | |
| 2006/0212851 A1 | 9/2006 | Hatlelid et al. | | |

OTHER PUBLICATIONS

Charles et al, "X 10: An object oriented approach to non uniform cluster computing", ACM OOPSLA, pp. 519-538, 2005.*

Rayside et al, "On the syllogistic structure of object oriented programming", IEEE, 113-122, 2001.*

Schrefl et al, "Behavior consistent specialization of object life cycle", ACM Trans. on Software Eng. and Methodology, vol. 11, No. 1, pp. 92-148, 2002.*

Zendra, et al. "Efficient Dynamic Dispatch without Virtual Function Tables.The SmallEiffel Compiler.", http://delivery.acm.org/10.1145/270000/263728/p125-zendra.pdf?key1=263728&key2=8894531711&coll=GUIDE&dl=GUIDE&CFID=11212258&CFTOKEN=53741807, last accessed Feb. 14, 2007, 17 pages, France.

Bacon. "Fast and Effective Optimization of Statically Typed Object-Oriented Languages," Dissertation, University of California, Berkeley, http://researchweb.watson.ibm.com/people/d/dfb/papers/Bacon97PhD-UMI.pdf, Dec. 1997, 154 pages.

Woo, et al. "Alias Analysis on Type Inference for Class Hierarchy in Java,"http://delivery.acm.org/10.1145/550000/545591/p206-woo.pdf?key1=545591&key2=0581631711&coll=GUIDE&dl=GUIDE&CFID=11218536&CFTOKEN=45730524, last accessed Feb. 14, 2007, 9 pages.

Swen. "An Overview of the Programming Language C**," http://icl.pku.edu.cn/member/bswen/_old_stuff/css/CssOverview.html, last accessed Feb. 14, 2007, 49 pages, Beijing, China.

* cited by examiner

CLASS-BASED OBJECT-ORIENTED FEATURES IN CLASS-LESS SCRIPT LANGUAGE

BACKGROUND

Computer programs are groups of instructions that describe actions to be performed by a computer or other processor-based device. When a computer program is loaded and executed on computer hardware, the computer will behave in a predetermined manner by following the instructions of the computer program. Accordingly, the computer becomes a specialized machine that performs the tasks prescribed by the instructions.

A programmer using one or more programming languages creates the instructions comprising a computer program. Typically, source code is specified or edited by a programmer manually and/or with help of an integrated development environment (IDE). Subsequently, the source code can be compiled or otherwise transformed by another program into computer instructions executable by a computer or like device.

By way of example, a programmer may choose to implement code utilizing an object-oriented programming language (e.g., C#®, Java® . . . ). In accordance with such a paradigm, programmers will create a number of classes identifying properties and characteristics of an abstract thing as well as methods describing class behavior or abilities. Specific programmatic logic can then be specified as interactions between instances of classes or objects, among other things. Subsequently, executable code for a particular machine can be produced by an associated compiler. Alternatively, code can be transformed into intermediate code for a target virtual machine to facilitate execution on multiple computer platforms via further compilation or interpretation of the intermediate code.

Object-oriented languages operate with respect plurality of unique programming features not included by other languages such as those described as prototype and/or object based. Three related concepts supported by true object oriented programming models are classes, inheritance and polymorphism.

A class is a data structure that merges state and actions into a single unit. In a class, state is captured by variables or fields, while actions are encapsulated by methods and/or functions. Among other things, a class provides a formal definition for instances of classes or objects. In other words, classes identify an associated object signature or pattern. Classes support both inheritance and polymorphism.

Inheritance pertains to composition of new classes utilizing previously defined classes. The new class sometimes called a subclass or derived class inherits attributes and behavior of a pre-existing base class. Inheritance provides a mechanism to specialize classes via overriding and/or extending inherited behavior.

Polymorphism refers to the ability to change meaning or behavior based on context associated with invocation. More particularly, a single definition/declaration can be utilized with different data types or classes of objects, wherein behavior is dictated by a type or class.

Inheritance and polymorphism intersect where derived classes override base class behavior. For example, a class Chihuahua can be derived from a base class Dog, where Dog has a single method bark( ) that returns woof. The class Chihuahua inherits this method. However, this specialized class can override the implementation of bark( ) to return a higher pitch bark associated with this particular small dog. Accordingly, bark( ) is polymorphic in that its implementation depends on an object class, namely Dog and Chihuahua. In some languages, bark( ) is referred to as a virtual method for the same reason.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, this disclosure pertains to dynamic dispatch and mechanisms for employment thereof. In accordance with one aspect of the disclosure, systems and methods are provided for representing class inheritance hierarchies and performing dynamic dispatch in a class-less scripting language such as PHP or JavaScript®. In accordance with another aspect of the disclosure, a dispatch construct can be generated for derived classes including method names and associated implementations to facilitate identification of an appropriate method implementation given an object type or related class. Further yet, the dispatch construct can be implemented utilizing various constructs of a target language including without limitation, dictionary objects, prototype objects and linked lists. Still further yet, dynamic dispatch can be optimized in a plurality of ways including elimination of dynamic dispatch were possible or pre-computing and/or caching lookup values to reduce future search.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods described in detail hereinafter pertain to dynamic dispatch in a class-less script language (e.g., PHP or JavaScript®). Representations of classes and/or interfaces including virtual methods can be translated into code of a target class-less language. In particular, class inheritance hierarchies are analyzed to generate one or more constructs such as dictionary objects that can be utilized to lookup method implementations by name. Optimizations can also be employed to eliminate dynamic dispatch where not required.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
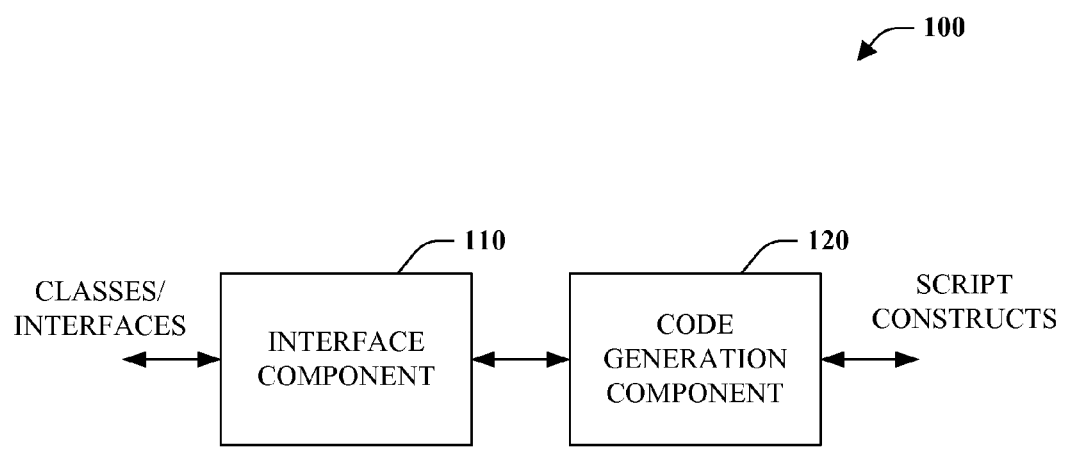
FIG. 1 is a block diagram of a programmatic code transformation system in accordance with an aspect of the claimed subject matter.

Referring initially to FIG. 1, a programmatic code-transformation system 100 is illustrated in accordance with an aspect of the claimed subject matter. In general, system 100 facilitates mapping true object-oriented language features and concepts into a scripting language such as class-less, JavaScript®, among others. In this manner, object-oriented language programs can be executed by a script, for instance in a web browser. In one embodiment, intermediate-language code can be translated or compiled into a web-browser scripting language. As a result, any languages that compile to intermediate-language code can be run in a browser.

Here, system 100 is more specifically targeted toward classes and interfaces as well as the object-oriented features and/or concepts supported thereby including inheritance, polymorphism and dynamic dispatch, among others. The system 100 includes an interface component 110 and a code generator component 120. The interface component 110 receives, retrieves or otherwise acquires a programmatic representation of classes, interfaces and/or utilization thereof. In one instance, the representation can correspond to a class/interface inheritance hierarchy that employs virtual methods. The code generator component 120 can receive or retrieve the code acquired by the interface component 110 and generate code in a target scripting language. The generated code encapsulates the semantics of a source language utilizing constructs of a target language.

Figure 2:
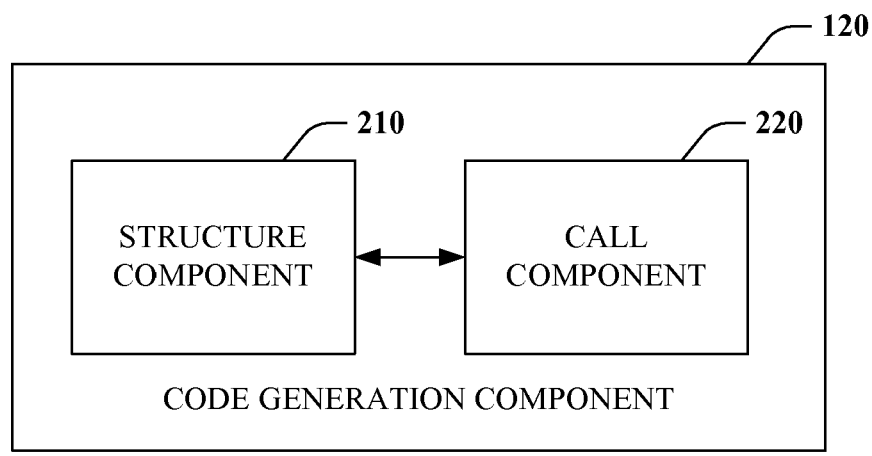
FIG. 2 is a block diagram of a representative code-generation component.

FIG. 2 depicts a representative code-generation component 120 in accordance with an aspect of the disclosed subject matter. The code generation component 120 includes a structure component 210 and a call component 220. The structure component 210 generates supporting programmatic structures. For example, classes, interfaces and their relationships may need to be simulated in a class-less language. The call component 220 modifies programming calls to target the structure generated by structure component 210. Overall, the structure and call components 210 and 220, respectively, cooperate to reproduce the semantics of a source language specification.

Figure 3:
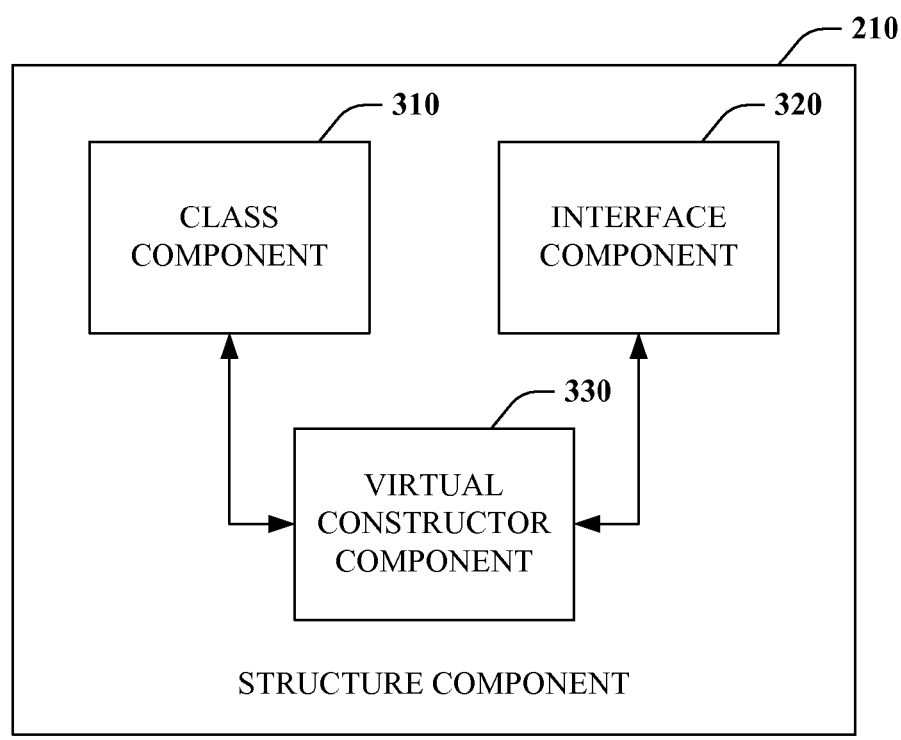
FIG. 3 is a block diagram of a representative structure component.

The structure component 210 is illustrated in further detail in FIG. 3. As depicted, the structure component 210 includes class component 310 and interface component 320 that generates representations of classes and interfaces, respectively, in a target language. By way of example, consider an exemplary class Foo with a DoFoo virtual method specified in a high-level language for clarity:

```
class Foo
{
    virtual public void DoFoo( ) { Console.WriteLine("Foo.DoFoo"); }
}
```
The virtual method can be translated into two script functions - one for when the caller knows the exact type of the object and another when the caller does not know the exact type of the object.
```
function Foo$DoFoo($a0)
{
    writeln("Foo.DoFoo");
    return;
}
function Foo$DoFoo$$virtual($a0)
{
    return $a0.$vtable.Foo$DoFoo($a0);
}
```

Here, the second version (henceforth the "$$virtual" version) assumes that object $a0 (representing the this pointer) has a $vtable field, which in turn has a Foo$DoFoo field, which points to the implementation of method Foo$DoFoo for object $a0. Objects of classes derived from Foo will need to provide such a v-table, as will be described further infra.

An interface method is equivalent to a virtual method. Interfaces by themselves do not provide implementations of their methods, and they should not be the exact type of any object. Hence, only the $$virtual version of interface methods are generated. Continuing the example:

```
interface IBar
{
    void Bar( );
}
```

From the above code the interface component 310 can generate:

```
function IBar$Bar$$virtual($a0)
{
    return $a0.$vtable.IBar$Bar($a0);
}
```

Notice that there is nothing special about interfaces in this system. Interface methods do not have an implementation in the interface itself, so virtual functions need not be generated for them, except when they are explicitly implemented by a given class.

The structure component 210 also includes a virtual constructor component 330. The virtual constructor component 330 is a mechanism for generating a dispatch construct identifying method implementations associated with objects. This construct is identified as vtable (virtual table) in the above example. However, an alternate implementation of a virtual table (v-table) is proposed. Conventionally, a v-table is a record of function pointers. It is an array of function pointers that are laid out in memory consecutively. In this case, one must know the correct slot or number in the v-table of a method to be called. One problem associated with an array of function pointers is that versioning can be very hard. If you have an array of function pointers and you would liked to add an extra function to a class, the array of pointers can be incorrectly updated resulting in an incorrect method invocation.

In accordance with an aspect of the claimed subject matter, the dispatch construct can include a mapping of method names (e.g., fully qualified, abbreviated . . . ) to implementations of the named method (e.g., function closure). For example, a dictionary object can be employed that stores name/value pairs or key/item mappings. Here, the key can be a unique method name and the corresponding item an implementation of the identified method. This makes the lookup very easy. Further, this may be the only approach, as some potential target languages like JavaScript®, do not support arrays for a conventional implementation while they do support dictionary objects. Furthermore, a conventional implementation may not be efficient especially if arrays are implemented in a target language as dictionary objects.

It is to be appreciated that the claimed subject matter supports a myriad of dispatch construct implementations not limited to the foregoing. For example, a dispatch construct can be specified as a linked list. In one instance, the linked list can be referenced to identify an object method. If the object method is not present, then an exception can be thrown and a parent class employed to locate the method. Additionally or alternatively, dispatch constructs can be added to objects via prototype objects.

Figure 4:
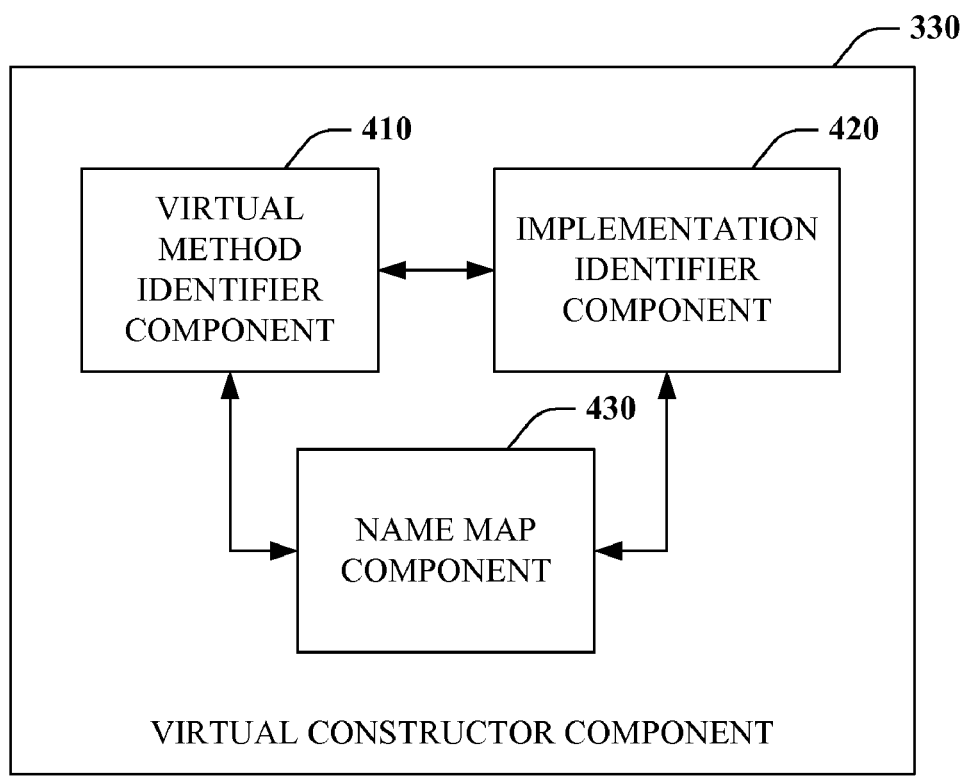
FIG. 4 is a block diagram of a representative virtual constructor component.

Turning to FIG. 4, a virtual constructor component 330 is illustrated in further detail. As shown, the constructor component includes a virtual method identifier component 410 and an implementation identifier component 420. As the name suggests, the virtual method identifier component 410 seeks to identify virtual methods implemented directly or indirectly by a class. This can be accomplished by selecting virtual methods in directed acyclic graph (DAG) formed by base types (e.g., classes, interfaces). Either a breadth first or depth first search will work since the search is exhaustive and order is irrelevant. These methods can be keys in a dictionary object implementation of a dispatch construct or v-table, for example. The implementation identifier component 420 identifies the most specific implementation for a class. Since a class does not have to implement all virtual methods itself the most specific implementation determination can start with the class itself and subsequently follow a chain of base classes. To facilitate clarity and understanding, consider the following extension of the previous example.

Making methods or functions virtual is only useful if some derived class overrides them, and interfaces in general are only useful if some class implements its methods. Accordingly, to understand how the previous class generations work for a concrete type, consider the following class:

```
class MyFooBar : Foo, IBAR
{
  public void Bar( ) { Console.WriteLine("MyFooBar.Bar"); }
  static void Main( )
  {
    My FooBar fooBar = new MyFooBar( );
    Foo foo =   fooBar;
    IBar bar = fooBar;
    foo.DoFoo( );
    bar.Bar( );
  }
}
```

Method Bar, regardless of being an implementation of IBar.Bar, is a virtual method itself, and it has an implementation, so the following code is generated:

```
function MyFooBar$Bar($a0)
{
   writeln("MyFooBar.Bar");
   return;
}
function MyFooBar$Bar$$virtual($a0)
{
   return $a0.$vtable.MyFooBar$Bar($a0);
}
```

Knowing how the $virtual functions were generated for base classes and interfaces, a dispatch construct is generated that will satisfy virtual calls to methods of any of its base classes or interfaces.

For the class MyFooBar, the virtual constructor component 330 can yield the following dispatch construct:

```
var MyFooBar$$vtable = {
   MyFooBar$Bar : MyFooBar$Bar
   , IBar$Bar : MyFooBar$Bar
   , Foo$DoFoo : Foo$DoFoo
};
```

Notice the object-literal/dictionary syntax. The above denotes a dictionary with three entries. On the left hand side are strings, used in the body $$virtual functions (as in "$a0.$vtable.MyFooBar$Bar"), and on the right hand side are pointers to the function implementations, which can be called with the "( )" (parenthesis) operator. If x=MyFooBar$$vtable, then x.IBar$Bar(y)=x["IBar$Bar"](y)=MyFooBar$Bar(y).

It is also to be noted that the virtual constructor component 330 can include a name map component 430 communicatively coupled to the virtual method identifer component 410 and/or the implementation identifier component 420. The map component 430 provides a mechanism for mapping virtual method names to alternate names. For example, a virtual method can include the name "verylongmethodname" which can be mapped in a dispatch construct to "shortname." Where this is employed, additional mapping functionality can be implemented explicitly or behind the scences by a compiler, for example, to ensure appropriate implementation selection.

Figure 5:
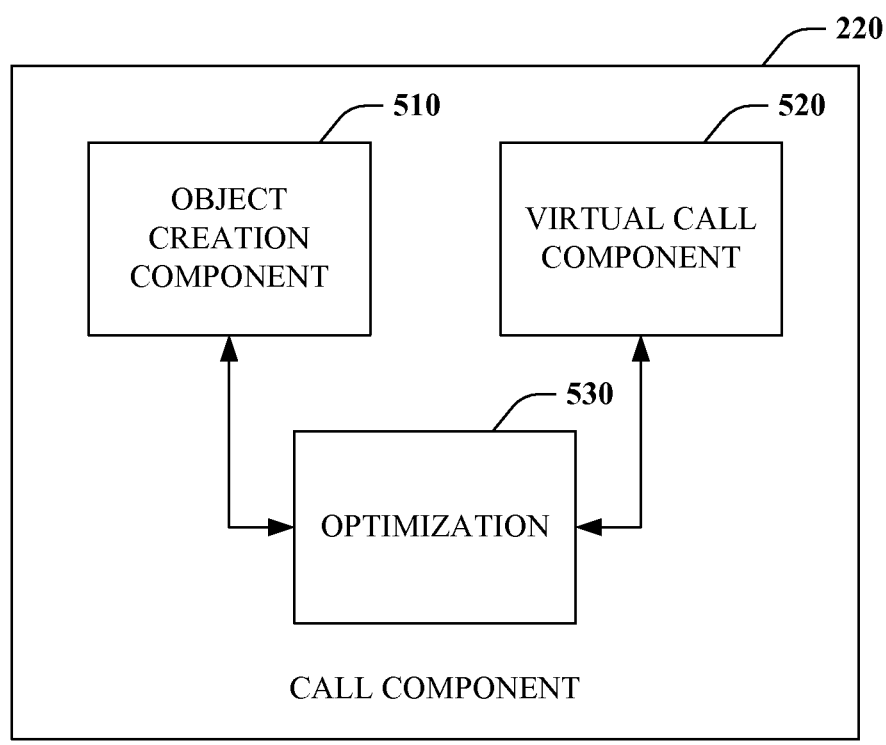
FIG. 5 is a block diagram of a representative call component.

Referring to FIG. 5, a representative call component 220 is depicted. Recall, the call component 220 provides a mechanism to modify or generate program calls to generated structure that preserve source program semantics. Object creation component 510 produces code that generates a new object in a target language. In addition to producing the object, the object component 510 can inject a field including a dispatch construct associated with an the object's class or a reference thereto. Virtual call component 520 generates a call to a generated virtual function in response to a virtual method call.

Continuing with the above example, it is instructional to consider the following exemplary IL code for method MyFooBar.Main:

```
.method private hidebysig static void Main( ) cil managed
{
   .entrypoint
   // Code size     23 (0x17)
   .maxstack 1
   .locals init (class MyFooBar V_0,
      class Foo V_1,
      class IBar V_2)
```

-continued

```
    IL_0000: newobj    instance void MyFooBar::.ctor( )
    IL_0005: stloc.0
    IL_0006: ldloc.0
    IL_0007: stloc.1
    IL_0008: ldloc.0
    IL_0009: stloc.2
    IL_000a: ldloc.1
    IL_000b: callvirt instance void Foo::DoFoo( )
    IL_0010: ldloc.2
    IL_0011: callvirt instance void IBar::Bar( )
    IL_0016: ret
} // end of method MyFooBar::Main
```

For this code, the following target code can be generated:

```
function MyFooBar$Main( )
{
   var $10;
   var $11;
   var $12;
   $10 = MyFooBar$$ctor({$vtable: MyFooBar$$vtable});
   $11 = $10;
   $12 = $10;
   Foo$DoFoo$$virtual($11);
   IBar$Bar$$virtual($12);
   return;
}
```

Here, object creation is translated to allocating a new target language object including a field, the v-table, and passing it to the constructor function, in this case MyFooBar$$ctor (implementation omitted). The value of the v-table field is directly derived from the newobj instruction by adding "$$vtable" to the type name. Callvirt instructions are translated to calls to $$virtual calls to the method indicated in the instruction. Regular call instructions (not shown here) can be translated directly to the implementation functions (that is, functions that do not end in $$virtual and appear on the right hand side of v-table dictionaries).

The call component 220 also includes optimization component 530. Dynamic dispatch enables types to be mapped to methods at runtime. One purpose is to support instances where the appropriate method cannot be determined at compile time. However, runtime lookup can be expensive. Accordingly, optimization component 530 can eliminate such a process where possible. For example, if it can be determined or inferred that a static type is equivalent to a dynamic type of an object dynamic dispatch can be eliminated. Similarly, dynamic dispatch can be eliminated when lookup can be done statically. It should also be appreciated that optimization can simply reduce expense rather than eliminating dynamic dispatch. For instance, rather performing a lookup for every virtual call, the lookup values can be pre-computed and/or cached. A check only needs to be made to determine if the type has changed or not. This can speed up dynamic lookup especially for loops.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the code generation component 120 can utilize such mechanisms to generate efficient code in a target language.

In view of the exemplary systems described supra, methodologies that may be implemented in accordance with the disclosed subject matter will be better appreciated with reference to the flow charts of FIGS. 6-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 6:
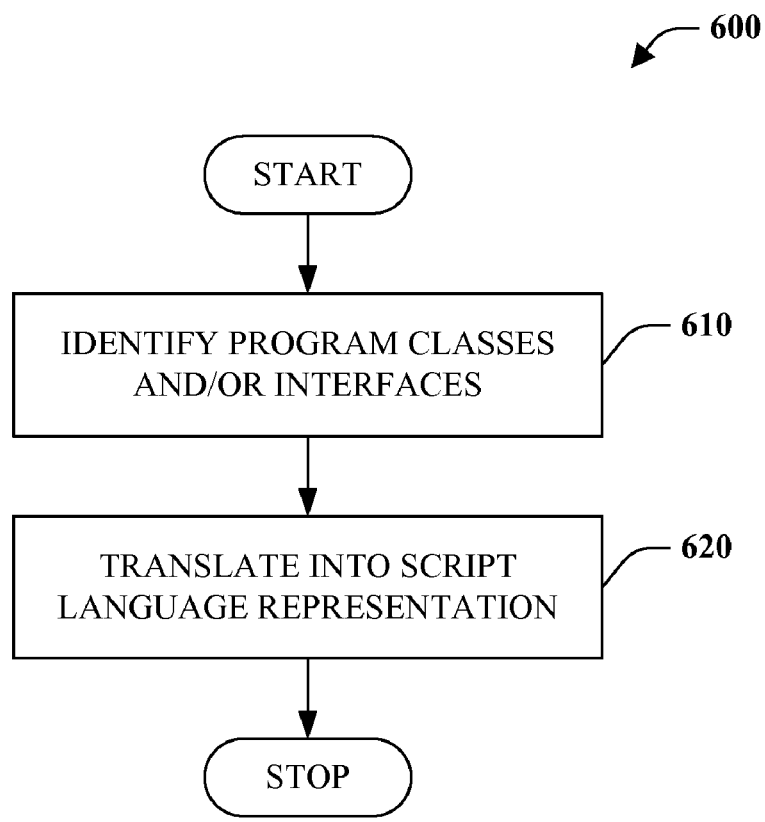
FIG. 6 is a flow chart diagram of a method of code generation.

Referring to FIG. 6, a method of code generation 600 is illustrated in accordance with an aspect of the claimed subject matter. At reference numeral 610, a plurality of classes and/or interfaces or representations thereof are identified with respect to a code source. The classes and/or interfaces can be can be related hierarchically via inheritance. Accordingly, object instances can include virtual methods to provide or override functionality of base classes. Dynamic dispatch can be employed to identify method invocations in situations where object types are not able to be determined statically.

At reference numeral, 620 the source code is translated into target script code. For example, the target code can correspond to a class-less script language such as PHP or JavaScript®. The translation can involve mapping source class constructs and features to target constructs and features. In one instance, class based dynamic dispatch semantics can be replicated via target language objects and functions.

In accordance with one aspect, the code generation method 600 can apply to compilation of intermediate language code to a web-browser script language. In this manner, object-oriented programming languages, among other programming languages, can be compiled to intermediate language (IL) code. This IL code can be compiled into a script language executable in a browser, wherein semantics of object-oriented features such as dynamic dispatch are preserved. In essence, an intermediate-language inheritance hierarchy can be mapped into a scripting language.

Figure 7:
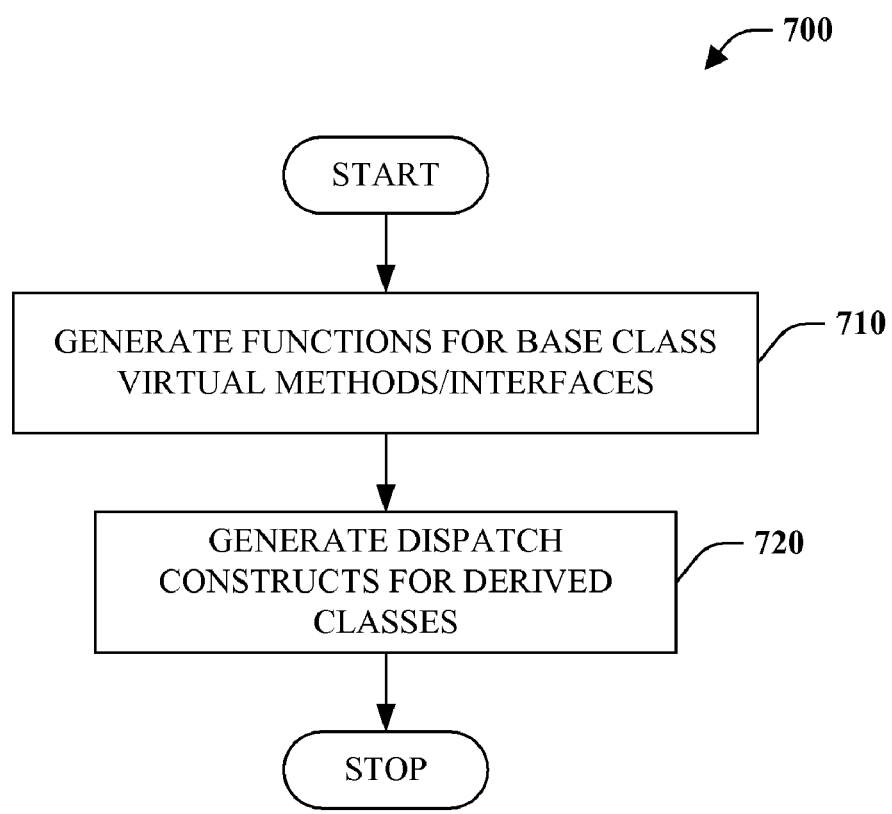
FIG. 7 is a flow chart diagram of a method of facilitating virtual method/interface translation.

FIG. 7 is a flow chart diagram of a method 700 of facilitating virtual method or interface translation in accordance with an aspect of the claimed subject matter. A virtual method is a function whose behavior is defined by a function with the same signature furthest away in inheritance lineage of an instantiated object on which it is called. For example, a base-class virtual method can be overridden by a derived-class implementation where the method is called with respect to an object of the derived class. Interface behavior is similarly defined with the exception that an interface typically does not include a base-class implementation.

At reference numeral 710, functions are generated for base class virtual methods/interfaces. Two functions can be employed with respect to virtual methods. One function can return a base implementation associated with a known type of the class. The other function facilitates lookup of a method invocation where the type is unknown at runtime, instance.

At 720, a lookup or dispatch construct is generated for classes derived from the base classes. The dispatch construct identifies methods and invocations to facilitate invoking the correct method, namely the most specific implementation. In other words, the dispatch construct identifies whether to invoke a base-class implementation or a derived-class implementation.

Figure 8:
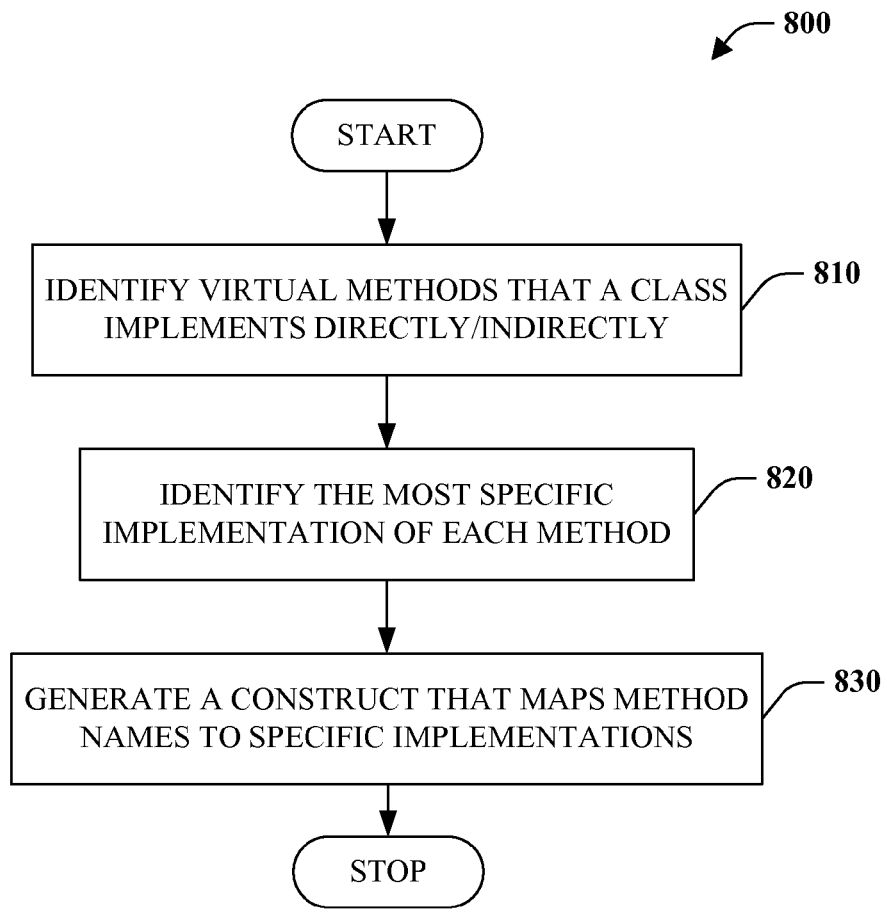
FIG. 8 is a flow chart diagram of a method of dispatch construct generation.

FIG. 8 is a flow chart diagram of a method 800 of dispatch construct generation. As previously described, dynamic dispatch utilizes a lookup construct or dispatch construct to identify virtual method invocations based on object type or class. In accordance with aspects of the claimed subject matter, this construct can take the form of target language constructs including a dictionary object, prototype object or linked list, among others. In one instance, the dispatch construct can provide a mapping from the method name to an implementation of that method, rather than a memory address and offset.

At reference numeral 810, virtual methods implemented by a class directly or indirectly are identified. Direct and indirect implementations need to be considered because a class need not implement all methods. It can inherit methods from a base class from which it depends. For each identified method, the most specific implementation is determined at numeral 820. Since derived classes are utilized to specialize a class, the most specific implementation can correspond to a derived-class implementation of a method of the same signature, where one exists. However, in an inheritance hierarchy this can become more difficult to determine. At reference numeral 830, a construct is generated that maps method names to implementations thereof (e.g., dictionary object).

Figure 9:
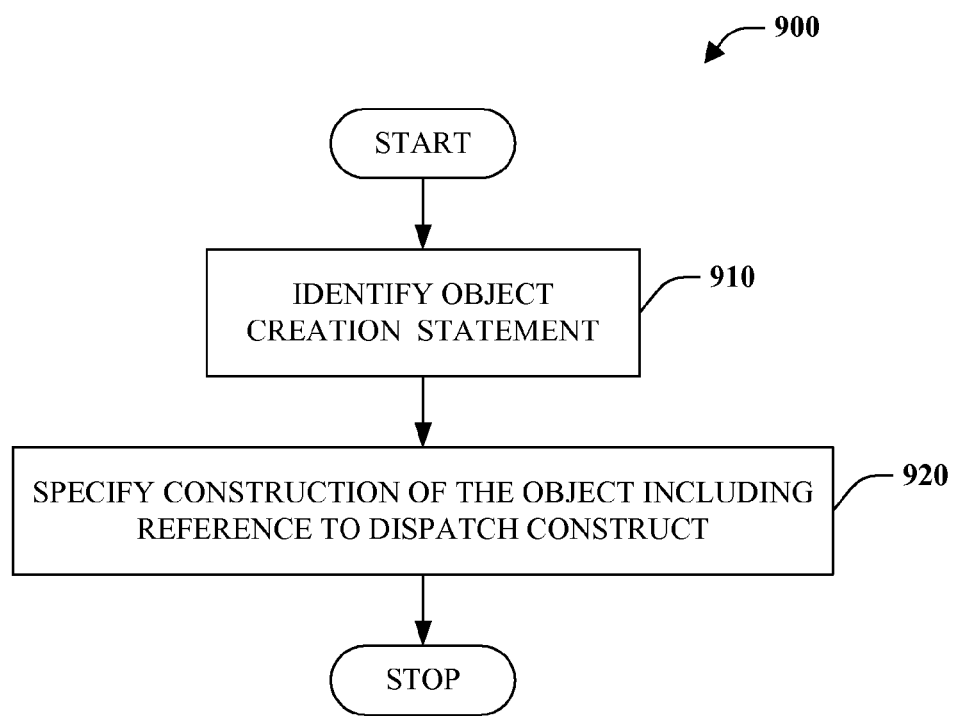
FIG. 9 is a flow chart diagram of an object creation method.

FIG. 9 depicts an object creation method 900 in accordance with an aspect of disclosed subject matter. At reference numeral 910, an object creation method call is identified in a source language (e.g., newobj instance void MyFooBar;;.ctor( )). At numeral 920, an object creation call is created in a target language including reference to an associated dispatch construct. For each object of a derived class or type, object creation should include at least reference to a dispatch construct to facilitate dynamic dispatch (e.g., MyFooBar$$ctor (t$vtable: MyFooBar&&vtable)). Objects of base types need not include such a reference.

Figure 10:
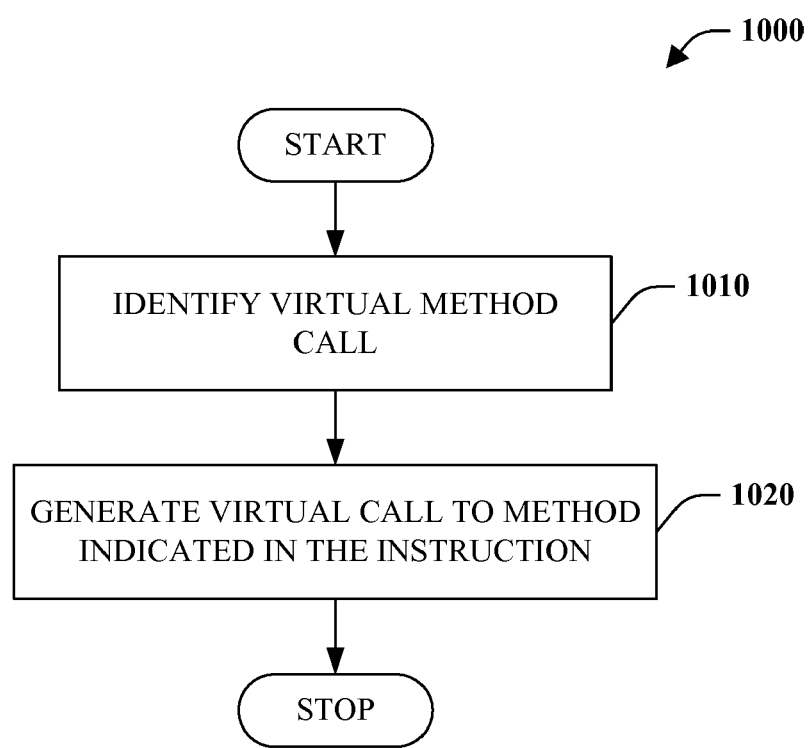
FIG. 10 is a flow chart diagram of a method of translating virtual method calls.

FIG. 10 is a flow chart diagram of a method for translating virtual method calls in accordance with an aspect of the disclosed subject matter. At reference numeral 1010, a virtual-method call is identified in a source language. For example, the method call could be specified as Callvirt instance void Foo::DoFoo(). At numeral 1020, an identified virtual-method call is translated into a virtual-method call in a target language. In particular, this can be accomplished by referencing an appropriate virtual function associated with a base class that identifies a proper method invocation based on a type known at runtime and returns the result of execution thereof. By way of example, the source code method call can be translated to Foo$Dofoo$$virtual($l1) in a target language, where $l1 identifies the type or class. This function can then call through to a dispatch construct for the type to identify the correct implementation. It should also be appreciated that although not shown optimization mechanisms can be utilized when translating such code to eliminate dynamic dispatch, where possible, and/or perform more efficient lookups.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
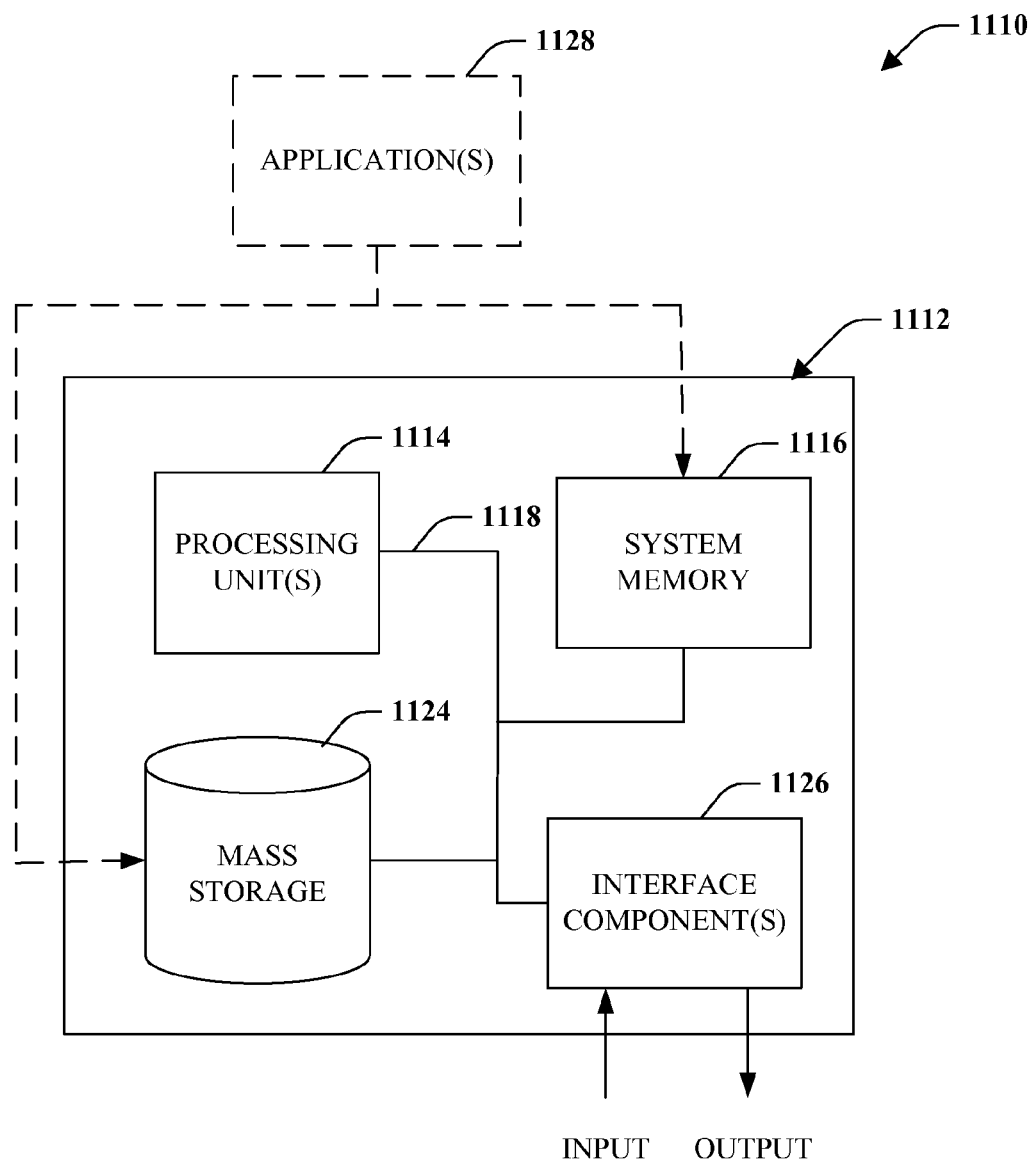
FIG. 11 is a schematic block diagram illustrating a suitable operating environment for aspects of the subject disclosure.
Figure 12:
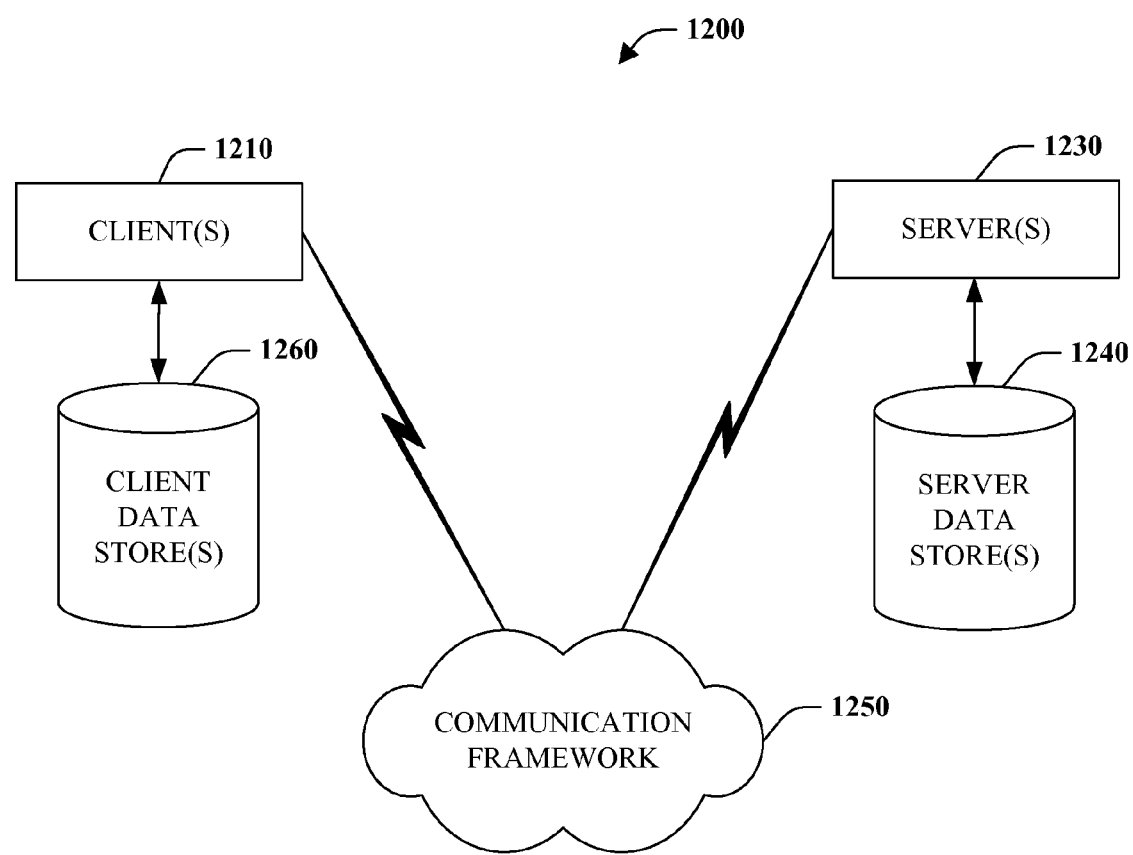
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116 and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230. For example, a program can be developed in an object-oriented language, compiled to intermediate language code and translated into a script language such as PHP or JavaScript® on server(s) 1230 and persisted to data store(s) 1240. Subsequently, the translated code can be transmitted from server(s) 1230 to client(s) 1210 for execution thereby utilizing the communication framework 1250.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A program transformation system, comprising:
a processor coupled to a memory, the processor configured to execute the following computer-executable components stored in the memory:

a code generation component that generates semantically equivalent code in a class-less scripting language from an object-oriented programming language representation of a hierarchy of one or more classes or interfaces and a virtual constructor component that produces a dispatch construct that captures class and/or interface method implementation to facilitate dynamic dispatch.

2. The system of claim 1, the dispatch construct is a dictionary object.

3. The system of claim 1, a dictionary object maps method names to one or more method implementations.

4. The system of claim 1, the dispatch construct is a linked list.

5. The system of claim 1, the dispatch construct is a prototype object.

6. The system of claim 1, comprising an object creation component that generates a new object with a reference to an associated dispatch construct.

7. The system of claim 1, comprising a call component that translates a virtual method call to a call to a function that identifies a method invocation from the dispatch construct for an object and returns results of execution thereof.

8. The system of claim 1, comprising an optimization component that eliminates dynamic dispatch when a static type is equivalent to a dynamic type of an object and/or lookup can be performed statically.

9. The system of claim 1, the representation is intermediate language code.

10. A method of dynamic dispatch, comprising:

employing at least one processor configured to execute computer-executable instructions stored in memory to perform the following acts:

identifying a representation of a virtual method call in a class-less scripting language; and locating an implementation for the virtual method call at runtime in a dispatch construct that maps method names to method implementations for objects utilizing code that captures class and/or interface inheritances relationships in the language.

11. The method of claim 10, locating the implementation in a dictionary object.

12. The method of claim 10, locating the implementation in a linked list.

13. A program compilation system, comprising:

computer-implemented means for acquiring an inheritance hierarchy of classes represented in intermediate language code; and computer-implemented means for implementing code semantics in a class-less scripting programming language; and computer-implemented means for generating a dispatch construct in the class-less scripting programming language that identifies method names and related method implementations.

14. The system of claim 13, the computer-implemented means for generating the dispatch construct generates a dictionary object.

* * * * *

UNITED STATES PATENT AND TRADEMARK OFFICE
CERTIFICATE OF CORRECTION

| | | |
|---|---|---|
| PATENT NO. | : 7,992,130 B2 | Page 1 of 1 |
| APPLICATION NO. | : 11/745125 | |
| DATED | : August 2, 2011 | |
| INVENTOR(S) | : Bruno S. Bozza et al. | |

It is certified that error appears in the above-identified patent and that said Letters Patent is hereby corrected as shown below:

In Face page, in field (54), under "Title" column 1, line 2, delete "SCRIPT" and insert -- SCRIPTING --, therefor.

In column 1, line 2, delete "SCRIPT" and insert -- SCRIPTING --, therefor.

In column 13, line 4, In Claim 1, after "interfaces" insert -- ; --.

Signed and Sealed this
Fourth Day of October, 2011

David J. Kappos
*Director of the United States Patent and Trademark Office*